United States Patent [19]

Shobu et al.

[11] Patent Number: 6,107,225

[45] Date of Patent: Aug. 22, 2000

[54] HIGH-TEMPERATURE CERAMICS-BASED COMPOSITE MATERIAL AND ITS MANUFACTURING PROCESS

[75] Inventors: Kazuhisa Shobu; Eiji Tani, both of Tosu, Japan

[73] Assignee: Agency of Industrial Science and Technology, Tokyo, Japan

[21] Appl. No.: 09/164,367

[22] Filed: Oct. 1, 1998

[30] Foreign Application Priority Data

Oct. 23, 1997 [JP] Japan ................................ 9-309917
Feb. 26, 1998 [JP] Japan ................................ 10-064128

[51] Int. Cl.[7] ........................ C04B 35/577; C04B 35/582
[52] U.S. Cl. ........................ 501/92; 501/96.3; 427/215; 264/682
[58] Field of Search .................... 501/92, 96.3; 427/215; 264/682

[56] References Cited

U.S. PATENT DOCUMENTS 5,000,896  3/1991  Petrovic et al. .................... 501/92
5,454,999  10/1995 Jayashankar et al. ............... 419/32
5,585,313  12/1996 Shobu et al. ....................... 501/89
5,887,241  3/1999  Jayashanker et al. ............... 419/14
5,990,025  11/1999 Shuyama et al. ................... 501/92

*Primary Examiner*—Karl Group
*Attorney, Agent, or Firm*—Oblon, Spivak, McClelland, Maier & Neustadt, P.C.

[57] ABSTRACT

The present invention provides a dense SiC-infiltrated composite material or a dense carbon-fiber-reinforced SiC-infiltrated composite material and a dense SiC-infiltrated composite material with granular carbon dispersed therein that are unlikely to bond to a carbon crucible and that have excellent heat and oxidation resistance. This composite material can be obtained by infiltrating molten carbon-silicide of Mo that is approximately expressed as $Mo_3Si_2C$ or a eutectic mixture of carbon-silicide and silicon carbide into a silicon-carbide-based preform having 10 to 60 vol. % of continuous voids and then cooling and solidifying the melt.

6 Claims, No Drawings

HIGH-TEMPERATURE CERAMICS-BASED COMPOSITE MATERIAL AND ITS MANUFACTURING PROCESS

FIELD OF THE INVENTION

The present invention relates to a high-temperature ceramics-based composite material that features excellent heat and oxidation resistance and frictional properties, and its manufacturing process. Specifically, this invention relates to a composite material consisting of a carbon-silicide of Mo and silicon carbide, the same composite material containing carbon fibers or a granular carbon phase, in its microstructure, and its manufacturing process using melt infiltration.

DESCRIPTION OF THE PRIOR ART

The reaction sintering process and melt infiltration process, which are conventionally used to manufacture composite materials, are advantageous in that almost no shrinkage or deformation occurs during manufacturing, and in that dense materials can be obtained. In ceramics, SiC—Si is widely used for industrial purposes. Composite materials obtained by the melt infiltration process require no auxiliary additive having a low melting point for densification, so the heat resistance of such composite materials can be improved easily compared with conventional sintered materials. Consequently, SiC—$MoSi_2$-melt-infiltrated composite materials, the heat resistance of which is higher than that of SiC—Si, have been developed [Journal of Materials Science (J. Mater. Sci.) Vol. 24, pp. 4144 to 4151 (1989)]. In addition, the inventors further examined the SiC—$MoSi_2$—composite materials to develop SiC—Mo(Al, Si)$_2$—melt-infiltrated materials that have higher oxidation resistance and are easier to manufacture, and which are disclosed in U.S. Pat. No. 5,583,313.

The infiltrated composite materials have excellent high-temperature properties, but during manufacturing a carbon material used as a crucible reacts with molten $MoSi_2$ or Mo(Al, Si)$_2$ that is infiltrated, so the crucible is bonded with the product and cannot be reused.

In addition, although the infiltrated composite materials are better in terms of their high-temperature mechanical properties compared to conventional sintered ceramics, they are essentially brittle at low temperatures and are thus not sufficiently reliable in some industrial applications.

To improve the toughness of such ceramics materials, a great deal of research has been conducted on combining ceramics with fibrous reinforcing materials. Of the reinforcing fibers, only carbon fibers have sufficient high-temperature properties, that is, they can withstand a temperature of 1,300° C. or higher. When a reinforced composite material is tobe manufactured using carbon fibers, the fibers are dense, so the entire composite material cannot be densified by normal sintering. The fibrous composite material, however, should be dense to have sufficient mechanical properties and the oxidation resistance. Thus, fiber-reinforced composite materials are generally manufactured by mixing powders of a matrix material and a fibrous reinforcing material together and hot-press-sintering the mixture, by repeatedly impregnating an organic metal polymer and subsequent pyrolysis, or by using chemical vapor infiltration (CVI). The hot-press process, however, inevitably damages the fibers and is limited in terms of the shape of the product. Whereas, the repeated impregnation-pyrolysis process, or the CVI process, requires a very long time for manufacturing and is clearly fundamentally limited in terms of the density it can achieve.

On the other hand, the melt infiltration process impregnates a preform having continuous pores with a melted liquid of a matrix material for solidification, and is inherently very promising as a process for manufacturing dense fiber-reinforced composite materials. In actual applications, however, this process must meet the following extremely severe conditions. First, if, during infiltration, reaction or firm bonding occurs between a matrix and fibers, reinforcing cannot be achieved by the fibers, as is well known. Thus, an infiltrant material must have a relatively low chemical affinity with the fibers. Conversely, if the chemical affinity is low, wettability is low and infiltration is difficult. Of course, despite a low wettability, infiltration can be facilitated by external pressurization but this is not practical due to the limitations on the shape of the product, as in the hot-press process, as well as the difficulty of finding a mold material that can withstand pressurization at high temperature. That is, spontaneous infiltration is desirable under industrial conditions, and so a sufficiently high wettabi lity is required. Due to these contradictory conditions, it is difficult to produce carbon-fiber- reinforced composite materials using the melt infiltration process, and no effective solution to this problem has yet been found.

In addition, since ceramics composite materials inherently have high heat resistance and high hardness, a great deal of research has been conducted on the use of these materials at high temperatures or at areas that requir wear resistance. Due to their inherently excellent characteristics, however, these materials are difficult to be processed or machined after fabrication, as is well known. Accordingly, sintering, which is a powder metallurgical process, is typically used to manufacture a model of a near net shape to the target product, which is then subjected to a minor finishing step to obtain the final product. In fact, however, this process requires a relatively large amount of postprocessing, which is difficult and thus substantially increases-manufacturing costs, thereby preventing the widespread use of these materials.

The above U.S. Pat. No. 5,583,313, developed by the inventors, involves the application of melt infiltration, which is a densifying process with no shrinkage or deformation, to the manufacturing of ceramics composite materials. This process can provide a product that has virtually the same shape as a target product and requires only a minimal amount of postprocessing. However, in industrial applications, ceramics materials, which feature excellent machinability and can be processed into desired shapes following manufacturing, are desirable.

If dense ceramics composite materials with a granular carbon phase dispersed therein can be obtained, they can be effectively utilized as high-temperature ceramics that can be processed easily. Due to the dispersed carbon phase, such composite materials have excellent frictional properties. However, due to the chemical affinity between the granular carbon phase and the infiltrant material, as between the carbo n fibers and the infiltrant material, no process for easily manufacturing such composite materials has yet been developed.

SUMMARY OF THE INVENTION

It is an object of this invention to solve the. conventional problems involving the manufacture of SiC-infiltrated composite materials and their properties, or the manufacture of carbon-fiber-reinforced composite materials or high-temperature ceramics composite materials with a granular carbon phase dispersed therein.

Specifically, it is a basic object of this invention to provide an infiltrant material that does not react with carbon, has high wettability to silicon carbide, and has excellent high-temperature mechanical properties and oxidation resistance, in order to provide a high-temperature composite material and its manufacturing process that solve the aforementioned problems.

Through continuous research involving the manufacture of high-temperature ceramics composite materials using the melt infiltration-process, the inventors have found that the bonding of an infiltrated material with a carbon crucible during manufacturing can be avoided, and that a composite material containing a carbon phase in its microstructure can be obtained by using as an infiltrant material carbon-silicide of Mo, or a eutectic melt of the carbon-silicide and silicon carbide that can chemically coexist with carbon and that has high oxidation resistance. The inventors developed the present invention based on this knowledge. This carbon-silicide of Mo is chemically characterized by its eutectic relationship with SiC and carbon, and its melted liquid is characterized in that it wets SiC well, whereas it exhibits relatively low wettability with carbon and is chemically inert to it.

Thus, this invention provides a dense high-temperature ceramics-based composite material produced by infiltrating a silicon-carbide-based porous preform with a melt of carbon- silicide of Mo that is approximately expressed as $Mo_3Si_2C$ or a eutectic mixture of carbon-silicide and silicon carbide, and cooling and solidifying, and also provides the manufacturing process for such a composite material. During manufacture, this infiltrant is unlikely to bond to the carbon crucible, so the crucible can be reused. In addition, if the silicon-carbide-based preform is reinforced by carbon fibers or contains a granular-carbon phase, a dense fiber-reinforced composite material or a composite material with excellent machinability and frictional properties can be obtained. This feature can be achieved due to the use of infiltrant material that does not react with carbon. As a result, this invention can provide a solution for the aforementioned problems of the conventional techniques.

Furthermore, the composite material according to this invention has such a high oxidation resistance that it can be used in the atmosphere at 1,300° C. or higher. It also has desirable high-temperature mechanical properties including high relative density and high strength and toughness. Even if the target product has a complicated shape, it can be produced in a near-net shape. Consequently, it can be used for various high-temperature applications. In addition, due to the oxidation resistance and high-temperature mechanical properties, this material can be effectively used for areas that require high heat resistance and high mechanical strength and reliability.

DESCRIPTION OF THE EMBODIMENTS

A high-temperature ceramics-based composite material and its manufacturing process according to this invention are specifically described below.

As described above, this invention uses a preform consisting of silicon carbide, a silicon-carbide-based preform containing carbon fibers, or a silicon-carbide- based preform containing granular carbon. First, the preform consisting of silicon carbide includes compacts of silicon carbide powder, whiskers, fibers, or the mixture of them, or their partially sintered products. In addition, a mixture of carbon and silicon may be used instead of silicon carbide to generate silicon carbide through reaction. In either case, this preform must be a silicon-carbide-based porous preform having 10 to 60 vol. % of porosity. With 10% or less of porosity, the preform has little continuous open channels through which a melted liquid can infiltrate, and infiltration is therefore insufficient. With 60% or more of porosity, the preform has an insufficient percentage of the silicon carbide phase that has excellent high-temperature properties, and the high-temperature properties of the composite material obtained are unsatisfactory as a result. This also applies to a preform containing carbon fibers or granular carbon.

The volume percentage of porosity can be set at 10% or less using coarse and fine grains of SiC and a preform that has a sufficient amount of open channels for infiltration can be manufactured, but the manufacturing process becomes complicated. Likewise, a preform having 60% or more of porosity can be used, but such a preform cannot be manufactured easily. Thus, the practical volume percentage of porosity is 10 to 60%.

Within the range, the percentage of porosity can be adjusted by partially sintering a green compact containing 10 wt. % or less of boron, carbon, and aluminum or by using the impregnation-pyrolysis process with organic metal polymer or CVI process. The size of material powder used to manufacture a porous body is not limited but is preferably 10 microns or less in terms of average particle size, because the mechanical strength of the product is high when the microstructure is fine and uniform. In contrast, coarse grains of SiC are preferable if creep deformation at high temperatures is a problem.

The preform containing carbon fibers may be a mixed molding of fine powder of silicon carbide and fibers, or its fired product. Alternatively, the preform may be a fibrous composite material produced using the impregnation-pyrolysis of organic metal polymer or CVI process. Such products are not inherently dense, so they have a sufficient amount of open pores for infiltration. That is, this invention can be utilized as a post-densification process for conventional fiber-reinforced composite materials.

The allowable content of carbon fibers depends on the form of the fibers. If, for example, short carbon fibers are simply mixed with SiC powder, appropriate infiltration will not occur if the preform contains 10 vol. % or more of carbon fibers. If, however, bundles of carbon fibers are used for reinforcement, as in a sheet of two-dimensionally woven carbon fabric, the preform may contain 40 vol. % or more of carbon fibers. In addition, if the surface of carbon fibers is chemically converted into silicon carbide, infiltration occurs even for a high fiber content.

On the other hand, the silicon-carbide-based preform containing a granular-carbon phase basically consists of 5 to 40 vol. %, (preferably 5 to 30 vol. %) of carbon phase and a remaining percentage of silicon carbide.

The amount of carbon phase can be arbitrarily set between 5 and 40 vol. %, but the mechanical properties and oxidation resistance of the composite material obtained improve as the amount of carbon phase decreases. If, however, this amount is smaller than 5 vol. %, the effects of the carbon phase on machinability and frictional property decrease significantly. In addition, if the amount is more than 40%, the oxidation resistance and the mechanical properties are degraded and it generally becomes difficult to manufacture a dense composite material using melt infiltration.

The amount of added carbon required to obtain a dense composite material depends strongly on the nature of carbon powder material. For example, for fine powder with particle size of submicron-order, infiltration is difficult to achieve with the addition of 10% or more of carbon. If carbon powder with particle size of several tens of microns or more is used, up to 40% of carbon can be added. Preferably, carbon powder that has been heated at 2,200° C. or higher, prior to infiltration, are used. Volatile components can be removed from such carbon powder to facilitate infiltration.

Thus, the amount of carbon can be set between 5 and 40% based on the tradeoff among manufacturing capability, machinability, frictional propertiy, mechanical properties, and oxidation resistance.

With these preforms, the high SiC content generally facilitates infiltration and is desirable for oxidation resistance. However, these preforms may contain not only the above carbon fibers or granular carbon but also compounds as secondary components. These components are effective in controlling the microstructure and improving the mechanical properties. These compounds must be compounds such as oxides, carbides, aluminides, silicides, borides, nitrides of Mo, W, Ta, Nb, Zr, Hf, V, Ti, or Cr, and/or mixed compounds such as carbon-silicides of them. If these components are not wetted well with the infiltrant material, sufficient infiltration does not occur unless the content of the components is small. Thus, these components are preferably those that are well wetted with the infiltrant material.

The infiltrant material according to this invention may be molten carbon-silicide of Mo or a eutectic mixture of carbon-silicide of Mo and silicon carbide. Specifically, the former is carbon-silicide of Mo that is approximately expressed as $Mo_3Si_2C$. However, it may be a solid solution with part of the Mo replaced by one or more of W, Ta, Nb, Zr, Hf, V, Ti, and Cr. Also, the addition of a small amount of B or Al is effective in preventing intermediate-temperature oxidation. When Al is added, a solid solution with part of the Si replaced, that is, $Mo_3(Si, Al)_2C$ may be used.

In addition, compound powders or a mass with the above composition may be used as the infiltrant. Alternatively, a mixture of powders of the respective elements or compounds may be used if they are mixed at such a ratio as to provide the above composition after reaction. As the material is heated up to the manufacturing temperature, the powder mixture reacts to form the desired carbon-silicide of Mo. The carbon-silicide of Mo is essential in allowing the reuse of a carbon crucible and easily obtaining a dense composite material containing a carbon phase. That is, as the infiltrant material, only carbon-silicide of Mo meets all required conditions; it exhibits sufficient oxidation resistance and mechanical properties at high temperatures, does not react with carbon, wets silicon carbide well, and facilitates infiltration.

First, a composite material manufactured by infiltrating a silicon-carbide-based preform with Mo carbon-silicide is described as a preferred embodiment of this invention. For example, fine SiC powders with particle diameter of about 2 microns or less are molded into a desired shape. SiC is dispersed in water with the addition of a small amount of binder such as methylcellulose and is dried to obtain powders, which are uniaxially pressed using a mold and then subjected to isotropic compression by a rubber press.

The preform obtained in this manner is put in a graphite crucible, and a molding of powders formed by mixing Mo, Si, and C at a desired ratio is placed on the preform, which is then heated at 2,000° or higher in argon gas to induce infiltration. As the temperature increases from 900 to 1,300° C., the Mo—Si—C-mixed powders react to form the single-phase carbon-silicide $Mo_3Si_2C$.

In this manner, a dense composite material, which comprises SiC as a skeleton with the voids filled with $Mo_3Si_2C$, is obtained.

Next, a composite material reinforced by carbon fibers is illustratively described as another preferred embodiment of this invention. First, a mixture of Si powder, phenol resin, and long carbon fibers is molded into a desired shape. For example, phenol resin is dissolved in an appropriate solvent, and Si powder is added to the solution to prepare a slurry. A sheet woven from long carbon fibers is immersed in the slurry, which is then dried to remove the solvent, and an appropriate mold is used to laminate and mold the mixture normally at 100 to 200° C.

The molding obtained in this manner is fired out between 1,300 and 1,500° C. to induce reaction between carbon, generated from the phenol resin, and Si to form silicon carbide. In this manner, a porous preform, which consists of a silicon carbide matrix and long fibers, is obtained.

Next, the preform obtained is placed in a graphite crucible, and a molding of Mo, Si, and C powders mixed together at a ratio corresponding to a eutectic composition of $Mo_3Si_2C$ and SiC is placed on the preform, which is then heated to a temperature higher than the eutectic point, that is, about 2,000° C. to induce infiltration. As the temperature increases, the mixed Mo, Si, and C powders react to form a eutectic mixture of $Mo_3Si_2C$ and SiC.

In this manner, a dense composite material, which is reinforced by carbon fibers and that has carbon-silicide of Mo and SiC as constituent phases of the matrix, is obtained.

A silica film forms on the surface of a matrix material in a hot atmosphere, resulting in a composite material with an excellent oxidation resistance. Although the use of this composite material cannot prevent the long carbon fibers from being oxidized, the material has a higher oxidation resistance than conventional porous fiber-reinforced composite materials. In addition, the use of short fibers instead of long ones prevents the carbon fibers from being oxidized or damaged.

A composite material with a granular-carbon phase dispersed in the microstructure is described as another preferred embodiment of this invention. First, the mixture of silicon carbide and carbon powders at a predetermined ratio is molded to manufacture a preform. For example, SiC and carbon are dispersed in water with the addition of a small amount of binder such as methylcellulose and the mixture is dried to obtain powder, which is uniaxially pressed using a mold and then subjected to isotropic compression by a rubber press. The preform molding obtained in this manner is subjected to infiltration as described above.

Next, this invention is described in detail with reference to the embodiments. It is, however, not limited to these examples.

Table 1 shows the manufacturing conditions for and the properties of composite materials according to the following embodiments and comparative examples. For example, NO. 3 in Table 1 shows the manufacturing conditions for and the characteristics of a composite material obtained using as a preform, a green compact obtained by molding SiC powder with an average particle size of 2 microns and pressurizing it using a rubber press. NOs. 5 and 6 show the manufacturing conditions for and the characteristics of a composite material containing short carbon fibers. NO. 7 shows the manufacturing conditions for and the characteristics of a composite material using an SiC preform containing-long carbon fibers. NOs 8 and 9 show the manufacturing conditions for and the characteristics of a composite material using an SiC preform containing granular carbon.

TABLE 1

| NO | Composition of the Preform | Density of the Preform (Vol %) | Composition of the Infiltrant Material (Vol %) | Infitration Temperature | Bonding to the Carbon Crucible | Microstructure of the Material Obtained |
|---|---|---|---|---|---|---|
| 1* | SiC | 58% | $MoSi_2$ | 2050° C. | Very firm | Dense |
| 2 | SiC | 58% | $Mo_3Si_2C$ | 2000° C. | Almost no Bonding | Dense |
| 3 | SiC | 58% | Eutectic Composition of $Mo_3Si_2C$ - 14% SiC | 2000° C. | No Bonding | Dense |
| 4 | SiC | 40% | $Mo_3Si_2C$ | 2000° C. | Almost no Bonding | Porous |
| 5 | SiC - 10% C Short Carbon Fibers | 45% | $Mo_3Si_2C$ | 2000° C. | Almost no Bonding | Dense |
| 6 | SiC - 20% C Short Carbon Fibers | 45% | $Mo_3Si_2C$ | 2000° C. | Almost no Bonding | No Infiltration |
| 7 | Sic - ~40% C Tow-dimensionally-Woven Long Carbon Fibers | 70% | Eutectic Composition of $Mo_3Si_2C$ - 14% SiC | 2000° C. | No Bonding | Relatively Dense |
| 8 | SiC - ~15% C (6 μm of C) | 50% | $Mo_3Si_2C$ | 2050° C. | Almost no Bonding | Relatively Dense |
| 9 | SiC - ~30% C (100 μm of C) | 60% | $Mo_3Si_2C$ | 2050° C. | Almost no Bonding | Relatively Dense |
| 10* | SiC - ~42% C (6 μm of C) | 60% | $Mo_3Si_2C$ | 2050° C. | Amost no Bonding | No Infiltration |

*An asterisk indicates a comparative example.

[Embodiment 1]

SiC powder with an average particle size of 2 microns was molded using a mold and pressurized using a rubber press to obtain a green compact that contained about 40 vol. % pores (voids). A molding of powders formed by mixing $MoSi_2$, C, and SiC powders at such a ratio as to yield a eutectic composition of SiC and $Mo_3Si_2C$ after reaction was placed on the preform, which was then heated at 2,000° C. in Ar for 10 minutes. As the temperature increased, the mixed powders reacted to form $Mo_3Si_2C$ and SiC. The SiC—$Mo_3Si_2C$ infiltrated composite material obtained had a relative density of 90% or more, and infiltrated sufficiently well at 2,000° C. . In addition, the sample did not bond to the carbon crucible, and could therefore be removed easily. NO. 3 in Table 1 shows the manufacturing conditions for and the infiltration characteristics of this sample.

[Embodiment 2]

Ten vol. % of short carbon fibers were mixed with SiC powder with an average particle size of 2 microns, and the mixture was molded to obtain a green compact that contained about 55 vol. % pores (voids). A molding of powders formed by mixing of $MoSi_2$, Mo, and SiC powders at a mole ratio of 1:5:2 was placed on the compact, which was then heated at 2,000° C. in Ar for 10 minutes. As the temperature increased, the mixed powders reacted to form $Mo_3Si_2C$. The SiC—$Mo_3Si_2C$ composite material obtained had a relative density of 90% or more. NO. 5 in Table 1 shows the manufacturing conditions for and the infiltration characteristics of this sample.

COMPARATIVE EXAMPLE 1

A molding of $MoSi_2$ powders was placed on a SiC green compact similar to that in Embodiment 1. The compact was heated in argon at 2,050° C. for 10 minutes to obtain an infiltrated composite material. After infiltration, the sample was firmly bonded to the carbon crucible, so the crucible had to be destroyed in order to remove the sample. NO. 1 in Table 1 shows the manufacturing conditions for and the infiltration characteristics of this sample.

[Embodiment 3]

Si powder with an average particle size of 7 microns and graphite powder with an average particle size of 6 microns were mixed together at such a ratio that about 15 vol. % of a carbon phase would remain after reaction and infiltration, and the mixture was molded. The molding was pressurized using a rubber press to obtain a preform green compact. The preform was placed on a mixture of $MoSi_2$, Mo, and SiC powders at such a ratio as to yield a composition of $Mo_3Si_2C$ after reaction, and the preform and powders were then heated at 2,050° C. in Ar for 10 minutes. As the temperature increased, the preform reacted to become SiC containing a carbon phase. The mixed powders similarly reacted to form a single phase of $MO_3Si_2C$, which melted at the infiltration temperature and infiltrated into the preform. After infiltration, the SiC—C—$Mo_3Si_2C$ composite material obtained contained about 15 vol. % of residual-carbon phase. It had a relative density of 90% or more, infiltrated sufficiently well at 2,050° C., and could be cut quickly and easily using a diamond cutter. NO. 8 in Table 1 shows the manufacturing conditions for and the infiltration characteristics of this sample.

[Embodiment 4]

Thirty vol. % of graphite powder with an average particle size of 100 microns was mixed with SiC powder with an average particle size of 2 microns, and the mixture was molded to obtain a preform green compact. The preform obtained had a relative density of about 60%. The preform was placed on a mixture of $MoSi_2$, Mo, and SiC powders at such a ratio as to yield the composition of $Mo_3Si_2C$, and the preform and powders were heated at 2,050° C. in Ar for 10 minutes. As the temperature increased, the mixed powders reacted to form a single phase of $Mo_3Si_2C$, which melted at the infiltration temperature and, infiltrated into the preform. After infiltration, the SiC—C—$Mo_3Si_2C$ composite material obtained contained about 30 vol. % of carbon phase. It had a relative density of 90% or more and could be cut easily. It could also be readily polished to a mirror-like finish, indicating that it had an excellent frictional property. NO. 9 in Table 1 shows the manufacturing conditions for and the infiltration characteristics of this sample.

COMPARATIVE EXAMPLE 2

An attempt was made to manufacture a composite material containing 40 vol. % or more of carbon phase, in the same manner as in Embodiment 4 except for the use of carbon powders with an average particle size of 6 microns. However, infiltration did not occur. This indicates that the amount of carbon incorporated depends on properties of material powders such as their particle size. Although the use of coarse carbon particles, as in Embodiment 4, enables a composite material containing 40% or more of carbon to be manufactured, the mechanical properties and oxidation resistance of the composite material obtained may be inappropriate. NO. 10 in Table 1 shows the manufacturing conditions for and the infiltration characteristics of this sample.

What is claimed is:

1. A high-temperature composite material formed by infiltrating molten carbon-silicide of Mo that is approximately expressed as $Mo_3Si_2C$ or a eutectic mixture of said carbon-silicide of Mo and silicon carbide into a silicon-carbide-based preform containing 10 to 60 vol. % of continuous voids and then solidifying the melt.

2. A high-temperature composite material wherein the preform described in claim 1 is a silicon-carbide-based preform reinforced by carbon fibers.

3. A high-temperature composite material wherein the preform described in claim 1 is a silicon-carbide-based preform containing 5 to 40 vol. % of granular-carbon phase.

4. A process for manufacturing a high-temperature composite material according to claim 1, comprising infiltrating molten carbon-silicide of Mo that is approximately expressed as $Mo_3Si_2C$ or a eutectic mixture of said carbon-silicide of Mo and silicon carbide into a silicon-carbide-based preform having 10 to 60 vol. % of continuous voids and then cooling and solidifying the melt.

5. A process for manufacturing a high-temperature composite material according to claim 4 wherein the preform is a silicon-carbide-based preform reinforced by carbon fibers.

6. A process for manufacturing a high-temperature composite material according to claim 4 wherein the preform is a silicon-carbide-based preform containing 5 to 40 vol. % of granular-carbon phase.

* * * * *